US012800522B2

(12) United States Patent
Heo et al.

(10) Patent No.: US 12,800,522 B2
(45) Date of Patent: Nov. 17, 2026

(54) APPARATUS AND METHOD FOR DETECTING FOREIGN SUBSTANCES WITHIN SECONDARY BATTERY ACTIVE MATERIAL

(71) Applicant: SAMSUNG SDI CO., LTD., Yongin-si (KR)

(72) Inventors: Kyoungheon Heo, Yongin-si (KR); Jin Seo Park, Yongin-si (KR)

(73) Assignee: SAMSUNG SDI CO., LTD., Yongin-Si (KR)

( * ) Notice: Subject to any disclaimer, the term of this patent is extended or adjusted under 35 U.S.C. 154(b) by 92 days.

(21) Appl. No.: 18/806,939

(22) Filed: Aug. 16, 2024

(65) Prior Publication Data

US 2025/0258113 A1 Aug. 14, 2025

(30) Foreign Application Priority Data

Feb. 14, 2024 (KR) ........................ 10-2024-0021238

(51) Int. Cl.

| | |
|---|---|
| ***G01N 23/16*** | (2018.01) |
| ***G01N 23/04*** | (2018.01) |
| ***G01N 23/083*** | (2018.01) |
| ***G01N 23/18*** | (2018.01) |

(52) U.S. Cl.

CPC ............. *G01N 23/18* (2013.01); *G01N 23/04* (2013.01); *G01N 23/083* (2013.01); *G01N 2223/643* (2013.01)

(58) Field of Classification Search

None

See application file for complete search history.

(56) References Cited

U.S. PATENT DOCUMENTS

| | | | | |
|---|---|---|---|---|
| 2014/0294144 | A1 | 10/2014 | Matoba | |
| 2019/0240864 | A1 * | 8/2019 | Ursella | B28B 3/123 |
| 2020/0343525 | A1 | 10/2020 | Hu et al. | |
| 2022/0291149 | A1 * | 9/2022 | Sakamoto | G01N 21/86 |

FOREIGN PATENT DOCUMENTS

| | | | |
|---|---|---|---|
| DE | 1589120 | B | 1/1968 |
| EP | 4 160 714 | A | 4/2023 |
| JP | 2012-109029 | A | 6/2012 |
| KR | 2014-0118795 | A | 10/2014 |
| WO | 2023/237238 | A | 12/2023 |

OTHER PUBLICATIONS

Mar. 25, 2025 Extended European Search Report in Counterpart European Patent Application No. 24 20 6395.6.

* cited by examiner

*Primary Examiner* — Hoon K Song

(74) *Attorney, Agent, or Firm* — Venable LLP

(57) ABSTRACT

Foreign substances in an active material that is used in an electrode for a secondary battery may be detected in embodiments of an apparatus and a method. The active material is in a powder state for an initial stage of a method of manufacturing a secondary battery. The apparatus for detecting foreign substances within the active material for may include means for equalizing an amount of the active material that is input to the apparatus, means for moving the input active material, and an irradiator configured to apply radiation to the moving active material and a radiation detector configured to detect radiation that has passed through the moving active material.

21 Claims, 16 Drawing Sheets

APPARATUS AND METHOD FOR DETECTING FOREIGN SUBSTANCES WITHIN SECONDARY BATTERY ACTIVE MATERIAL

CROSS-REFERENCE TO RELATED APPLICATION

The present application claims priority to and the benefit of Korean Patent Application No. 10-2024-0021238, filed on Feb. 14, 2024, in the Korean Intellectual Property Office, the entire disclosure of which is incorporated herein by reference.

BACKGROUND

1. Technical Field

The present disclosure relates to a secondary battery, and more particularly, to a technology for detecting foreign substances in an active material that is used in electrodes for a secondary battery.

2. Related Art

Unlike a primary battery that cannot be recharged, a secondary battery is designed to be discharged and recharged. In general, a secondary battery includes an electrode assembly composed of positive/negative electrode plates and a separator. After a process of coating an active material on a substrate, the positive/negative electrode plates of the electrode assembly may be manufactured through processes such as press rolling, dry, slitting, and notching.

The process of coating the active material for manufacturing the negative electrode plate includes coating the active material, such as graphite or carbon, on the substrate made of metal, such as copper, a copper alloy, nickel, or a nickel alloy.

The process of coating the active material for manufacturing the positive electrode plate may include coating the active material, such as transition metal oxide, on the substrate made of metal, such as aluminum or an aluminum alloy.

For the active material, lithium nickel-based oxide, lithium cobalt-based oxide, lithium manganese-based oxide, a lithium iron phosphate-based compound, cobalt-free nickel-manganese-based oxide, a binder, or a conductive material may be used as a positive electrode active material. Crystalline carbon, soft carbon or hard carbon, such as natural graphite or synthetic graphite, mesophase pitch carbides, amorphous carbon such as calcined coke, and silicon or a silicon-carbon complex may be used as a negative electrode active material.

The information disclosed in this Background section is for enhancement of understanding of the background of the present disclosure, and it may therefore contain information that does not constitute related (or prior) art.

SUMMARY

In view of the nature of a secondary battery, if foreign substances are mixed with an active material, fatal problems can occur in performance and safety of the battery. Accordingly, various embodiments are directed to providing an apparatus and method for detecting foreign substances in an active material in a powder state, that is, an initial stage of a method of manufacturing a secondary battery.

An apparatus for detecting foreign substances in an active material that is used in a secondary battery according to an aspect of the present disclosure may include means for equalizing the amount of the active material that is input to the apparatus, means for moving the input active material, and an irradiator configured to apply radiation to the moving active material and a radiation detector configured to detect radiation that passes through the moving active material.

In some embodiments, the means for equalizing the amount of the active material may include a planarization rod configured to spread the active material so that the height of the input active material is constant. In other embodiments, the means for equalizing the amount of the active material may include a sample bucket configured to contain the active material and a planarization rod configured to spread a surface of the active material contained in the sample bucket such that a height of the active material is constant.

Further, a method of detecting foreign substances in an active material that is used in a secondary battery according to another aspect of the present disclosure may include inputting an active material to an apparatus, making an amount of input of the active material that is input to the sample input part uniform, moving the input active material, and applying radiation to the moving active material and detecting radiation that has passed through the moving active material.

In another aspect, an apparatus is provided for detecting foreign substances in an active material for a secondary battery. The apparatus comprises a planarization rod configured to spread the active material such that a height of the active material is constant; a conveyor belt for moving the active material; an irradiator configured to apply radiation to the active material being moved by the conveyor belt; and a radiation detector configured to detect radiation that passes through the active material.

Aspects of the present disclosure are not limited to the above descriptions, and other aspects not specifically mentioned herein, and aspects of the present disclosure that would address such problems, will be clearly understood by those skilled in the art from the description of the present disclosure.

BRIEF DESCRIPTION OF THE DRAWINGS

The following drawings attached to the present specification illustrate embodiments of the present disclosure, and further describe aspects of the present disclosure together with the detailed description of the present disclosure. Thus, the present disclosure should not be construed as being limited to the drawings.

DETAILED DESCRIPTION

Figure 1:
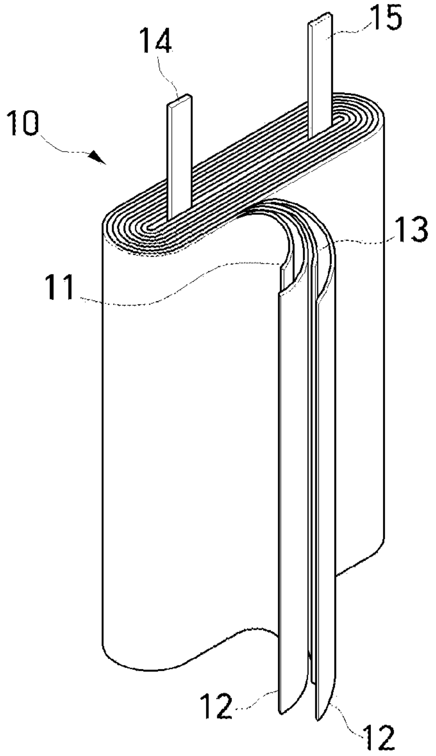
FIG. 1 schematically illustrates an electrode assembly of a secondary battery.

Hereinafter, embodiments of the present disclosure will be described, in detail, with reference to the accompanying drawings. The terms or words used in the present specification and claims are not to be limitedly interpreted as general or dictionary meanings and should be interpreted as meanings and concepts that are consistent with the technical idea of the present disclosure on the basis of the principle that an inventor can be his/her own lexicographer to appropriately define concepts of terms to describe his/her invention in the best way.

The embodiments described in this specification and the configurations shown in the drawings are only some of one or more embodiments of the present disclosure and do not represent all of the aspects of the present disclosure. Accordingly, it should be understood that there may be various equivalents and modifications that can replace or modify one or more embodiments described herein at the time of filing this application.

It will be understood that if an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, if a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" if describing embodiments of the present disclosure relates to "one or more embodiments of the present disclosure." Expressions, such as "at least one of" and "any one of," if preceding a list of elements, modify the entire list of elements and do not modify the individual elements of the list. When phrases such as "at least one of A, B and C, "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," if used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112 (a) and 35 U.S.C. § 132 (a).

References to two compared elements, features, etc. as being "the same" may mean that they are "substantially the same." Thus, the phrase "substantially the same" may include a case having a deviation that is considered low in the art, for example, a deviation of 5% or less. In addition, if a certain parameter is referred to as being uniform in a given region, it may mean that it is uniform in terms of an average.

Throughout the specification, unless otherwise stated, each element may be singular or plural.

Arranging an arbitrary element "above (or below)" or "on (under)" another element may mean that the arbitrary element may contact the upper (or lower) surface of the element, and another element may also be interposed between the element and the arbitrary element located on (or under) the element.

In addition, it will be understood that if a component is referred to as being "linked," "coupled," or "connected" to another component, the elements may be directly "coupled," "linked" or "connected" to each other, or another component may be "interposed" between the components."

Throughout the specification, if "A and/or B" is stated, it means A, B or A and B, unless otherwise stated. That is, "and/or" includes any or all combinations of a plurality of items enumerated. When "C to D" is stated, it means C or more and D or less, unless otherwise specified.

The terminology used herein is for the purpose of describing embodiments of the present disclosure and is not intended to limit the present disclosure.

FIG. 1 briefly shows an electrode assembly 10 of a secondary battery. The electrode assembly 10 may be formed by winding or stacking a first electrode plate 11, a separator 12, and a second electrode plate 13, which are formed as thin plates or films. If the electrode assembly 10 is a wound type, a winding axis may be parallel to a longitudinal direction (e.g., the y direction) of the case 51 (see FIG. 4). In other embodiments, the electrode assembly 10 may be a stack type rather than a wound type, and the shape of the electrode assembly 10 is not limited in the present disclosure. In addition, the electrode assembly 10 may be a Z-stack electrode assembly in which a positive electrode plate and a negative electrode plate are inserted to both sides of a separator, which is then bent into a Z-stack. Further, one or more electrode assemblies may be stacked such that long sides of the electrode assemblies are adjacent to each other and accommodated in a case, and the number of electrode assemblies in the case is not limited in the present disclosure. The first electrode plate 11 of the electrode assembly may act as a negative electrode, and the second electrode plate 13 may act as a positive electrode. Of course, the reverse is also possible.

The first electrode plate 11 may be formed by applying a first electrode active material, such as graphite or carbon, to a first electrode substrate formed of a metal foil, such as copper, a copper alloy, nickel, or a nickel alloy. The first electrode tab 14 may be connected to an external first terminal (not shown). In some embodiments, when the first electrode plate 11 is manufactured, the first electrode tab 14 may be formed by being cut in advance to protrude to one side of the electrode assembly 10, or the first electrode tab 14 may protrude to one side of the electrode assembly 10 more than (e.g., farther than or beyond) the separator 12 without being separately cut.

The second electrode plate 13 may be formed by applying a second electrode active material, such as a transition metal oxide, on a second electrode substrate formed of a metal foil, such as aluminum or an aluminum alloy. The second electrode plate 13 may include a second electrode tab 15 (e.g., a second uncoated portion) that is a region to which the second electrode active material is not applied. The second electrode tab 15 may be connected to an external second terminal (not shown). In some embodiments, the second electrode tab 15 may be formed by being cut in advance to protrude to the other side (e.g., the opposite side) of the electrode assembly 10 when the second electrode plate 13 is manufactured, or the second electrode plate 13 may protrude to the other side of the electrode assembly more than (e.g., farther than or beyond) the separator 12 without being separately cut.

In some embodiments, the first electrode tab 14 may be located on the left side of the electrode assembly 10 and the second electrode tab 15 may be located on the right side of the electrode assembly 10. In other embodiments the first electrode tab 14 and the second electrode tab 15 may be located on one side of the electrode assembly 10 in the same direction.

Here, for convenience of description, the left and right sides are defined according to the electrode assembly 10 oriented as illustrated in FIG. 1, and the positions thereof may change if the secondary battery is rotated left and right or up and down.

The separator 12 prevents a short-circuit between the first electrode plate 11 and the second electrode plate 13 while allowing movement of lithium ions therebetween. The separator 12 may be made of, for example, a polyethylene film, a polypropylene film, a polyethylene-polypropylene film, or the like.

Figure 2:
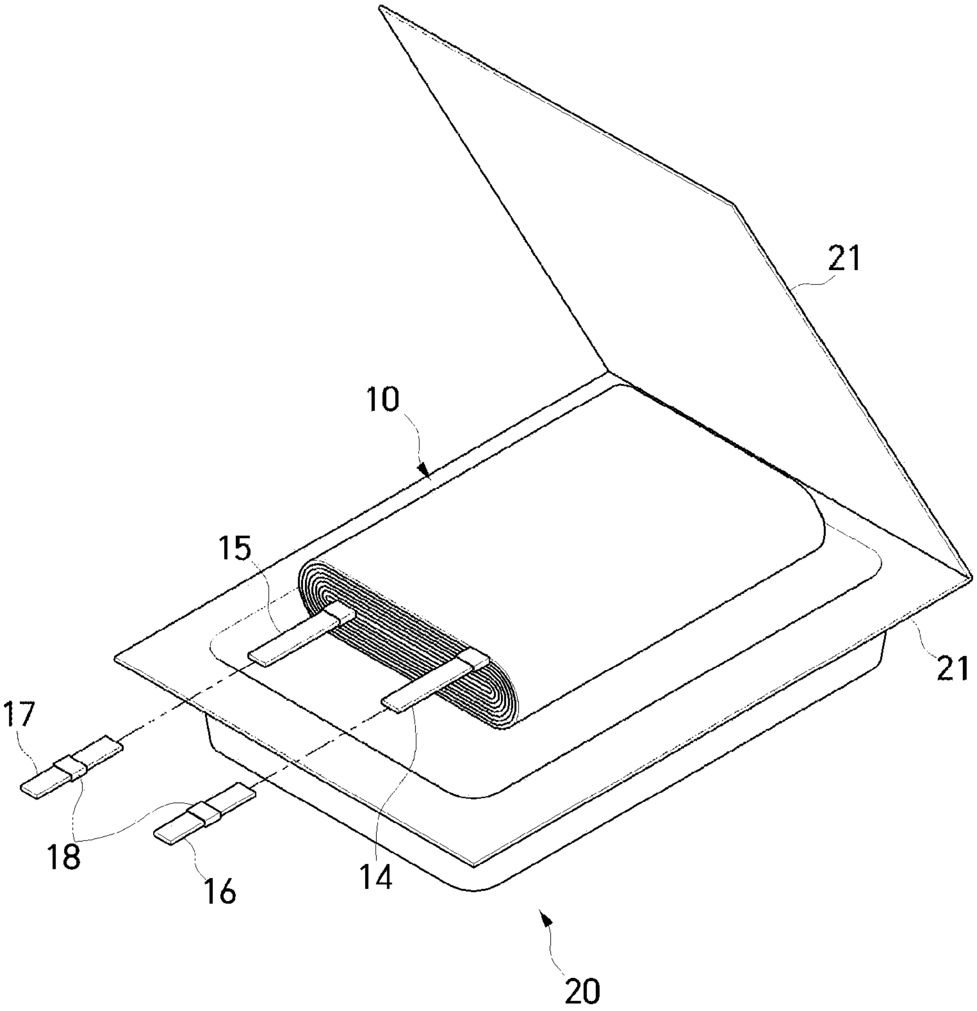
FIG. 2 schematically illustrates a pouch-type secondary battery.
Figure 3:
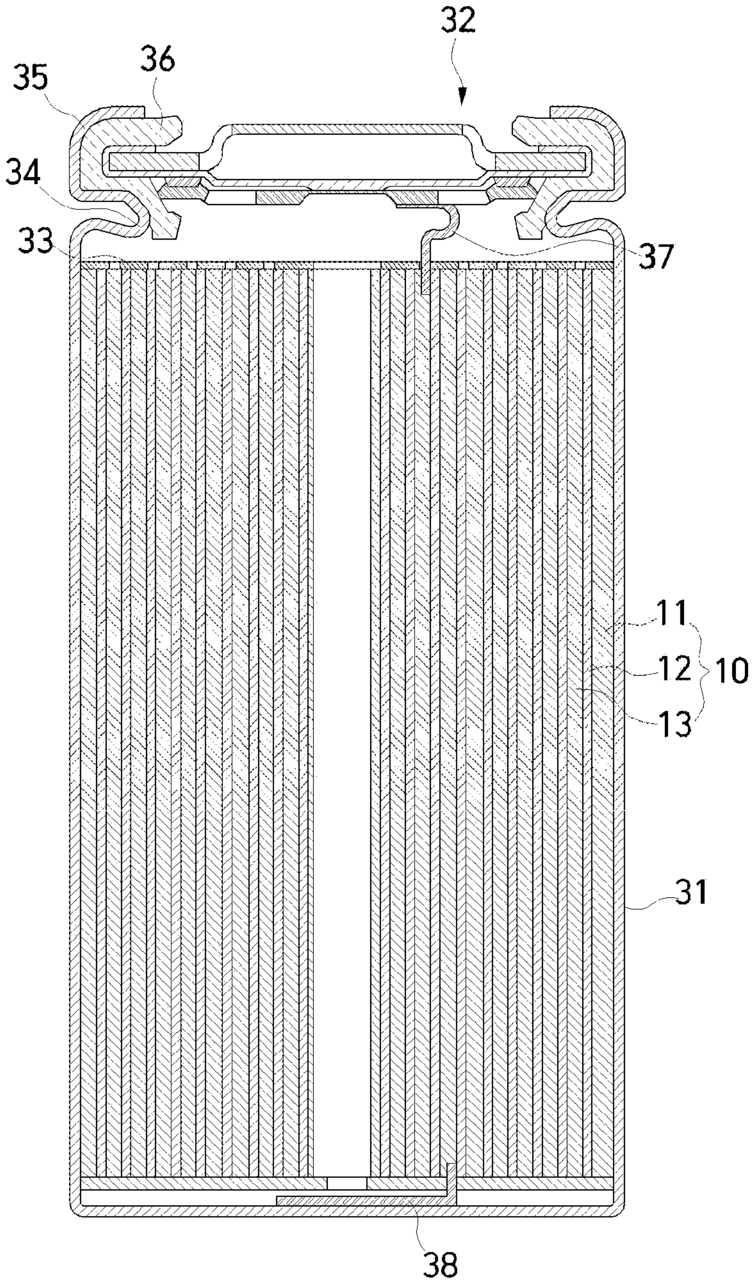
FIG. 3 is a cross-sectional view of a cylindrical secondary battery.
Figure 4:
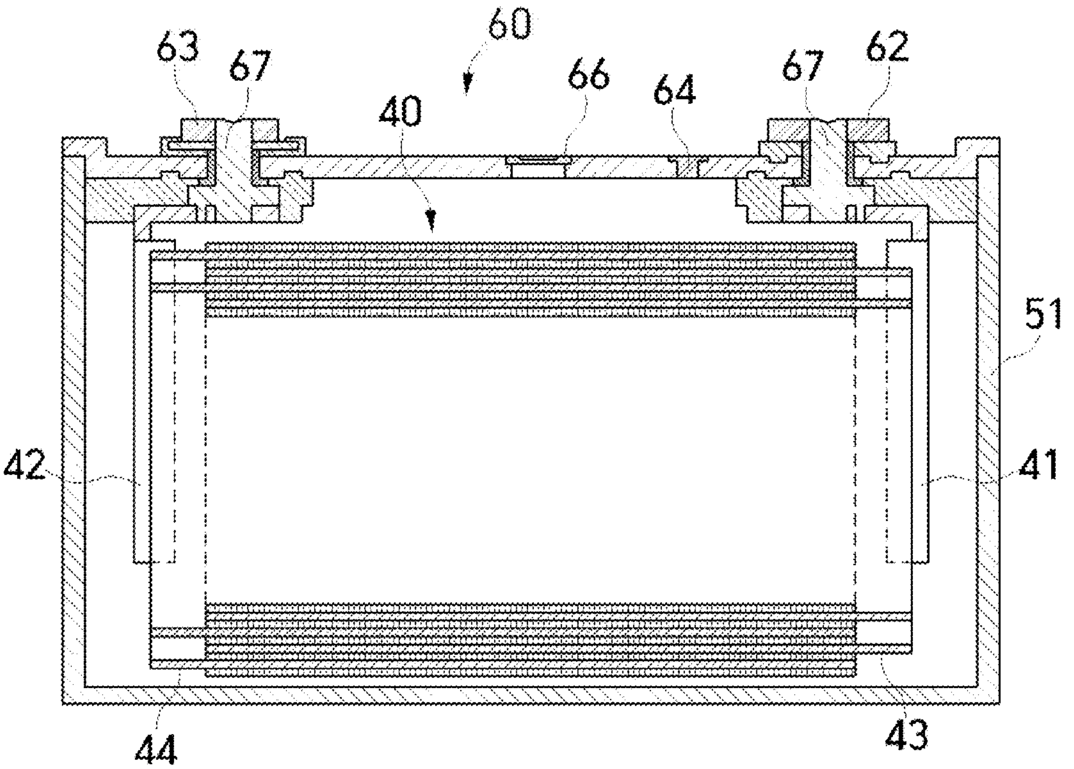
FIG. 4 illustrates an internal configuration of a prismatic secondary battery.

In some embodiments, the electrode assembly 10 may be accommodated in the case (not shown) along with an electrolyte. In a pouch-type secondary battery, an electrode assembly 10 may be accommodated in a pouch made of flexible material as illustrated in FIG. 2. In a cylindrical or prismatic secondary battery, an electrode assembly 10 may be accommodated in a cylindrical or prismatic metal casing in as illustrated in FIGS. 3 and 4.

Some of the materials that may be used for the secondary battery according to some embodiments of the present disclosure will be described.

As the positive electrode active material, a compound capable of reversibly intercalating/deintercalating lithium (e.g., a lithiated intercalation compound) may be used. For example, at least one of a composite oxide of lithium and a metal selected from cobalt, manganese, nickel, and combinations thereof may be used.

The composite oxide may be a lithium transition metal composite oxide, and examples thereof include a lithium nickel-based oxide, a lithium cobalt-based oxide, a lithium manganese-based oxide, a lithium iron phosphate-based compound, a cobalt-free nickel-manganese-based oxide, or a combination thereof.

As an example, a compound represented by any one of the following formulas may be used: $Li_aA_{1-b}X_bO_{2-c}D_c$ ($0.90 \le a \le 1.8$, $0 \le b \le 0.5$, $0 \le c \le 0.05$); $Li_aMn_{2-b}X_bO_{4-c}D_c$ ($0.90 \le a \le 1.8$, $0 \le b \le 0.5$, $0 \le c \le 0.05$); $Li_aNi_{1-b-c}Co_bX_cO_{2-\alpha}D_\alpha$ ($0.90 \le a \le 1.8$, $0 \le b \le 0.5$, $0 \le c \le 0.5$, $0 \le \alpha < 2$); $Li_aNi_{1-b-c}Mn_bX_cO_{2-\alpha}D_\alpha$ ($0.90 \le a \le 1.8$, $0 \le b \le 0.5$, $0 \le c \le 0.5$, $0 < \alpha < 2$);

$Li_aNi_bCo_c{}^1{}_dG_eO_2$ ($0.90 \le a \le 1.8$, $0 \le b \le 0.9$, $0 \le c \le 0.5$, $0 \le d \le 0.5$, $0 \le e \le 0.1$); $Li_aNiG_bO_2$ ($0.90 \le a \le 1.8$, $0.001 \le b \le 0.1$); $Li_a$-$CoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $Li_{(3-f)}Fe_2(PO_4)_3$ ($0 \le f \le 2$); and $Li_aFePO_4$ ($0.90 \le a \le 1.8$). In the these formulas: A is Ni, Co, Mn, or a combination thereof; X is Al, Ni, Co, Mn, Cr, Fe, Mg, Sr, V, a rare earth element, or a combination thereof; D is O, F, S, P, or a combination thereof; G is Al, Cr, Mn, Fe, Mg, La, Ce, Sr, V, or a combination thereof; and $L^1$ is Mn, Al, or a combination thereof.

A positive electrode for a lithium secondary battery may include a substrate and a positive electrode active material layer formed on the substrate. The positive electrode active material layer may include a positive electrode active material and may further include a binder and/or a conductive material. The content of the positive electrode active material may be in a range of about 90 wt % to about 99.5 wt % on the basis of 100 wt % of the positive electrode active material layer, and the content of the binder and the conductive material is in a range of about 0.5 wt % to about 5 wt %, respectively, on the basis of 100 wt % of the positive electrode active material layer.

The substrate may be aluminum (Al), but is not limited thereto.

The negative electrode active material may include a material capable of reversibly intercalating/deintercalating lithium ions, lithium metal, an alloy of lithium metal, a material capable of being doped and undoped with lithium, or a transition metal oxide. The material capable of reversibly intercalating/deintercalating lithium ions may be a carbon-based negative electrode active material, which may include, for example, crystalline carbon, amorphous carbon, or a combination thereof. Examples of the crystalline carbon may include graphite, such as natural graphite or artificial graphite, and examples of the amorphous carbon may include soft carbon, hard carbon, a pitch carbide, a mesophase pitch carbide, sintered coke, and the like.

A Si-based negative electrode active material or a Sn-based negative electrode active material may be used as the material capable of being doped and undoped with lithium. The Si-based negative electrode active material may be silicon, a silicon-carbon composite, $SiO_x$ ($0<x<2$), a Si-based alloy, or a combination thereof. The silicon-carbon composite may be a composite of silicon and amorphous carbon. According to one embodiment, the silicon-carbon composite may be in the form of a silicon particle and amorphous carbon coated on the surface of the silicon particle. The silicon-carbon composite may further include crystalline carbon. For example, the silicon-carbon composite may include a core including crystalline carbon and silicon particle and an amorphous carbon coating layer on the surface of the core.

A negative electrode for a lithium secondary battery may include a substrate and a negative electrode active material layer disposed on the substrate. The negative electrode active material layer may include a negative electrode active material and may further include a binder and/or a conductive material. The negative electrode active material layer may include about 90 wt % to about 99 wt % of a negative electrode active material, about 0.5 wt % to about 5 wt % of a binder, and about 0 wt % to about 5 wt % of a conductive material.

A non-aqueous binder, an aqueous binder, a dry binder, or a combination thereof may be used as the binder. If an aqueous binder is used as the negative electrode binder, a cellulose-based compound capable of imparting viscosity may be further included.

As the negative electrode substrate, one selected from copper foil, nickel foil, stainless steel foil, titanium foil, nickel foam, copper foam, conductive metal-coated polymer substrate, and combinations thereof may be used.

An electrolyte for a lithium secondary battery may include a non-aqueous organic solvent and a lithium salt. The non-aqueous organic solvent acts as a medium through which ions involved in the electrochemical reaction of the battery can move. The non-aqueous organic solvent may be a carbonate-based, an ester-based, an ether-based, a ketone-based, an alcohol-based solvent, an aprotic solvent, and may be used alone or in combination of two or more. If a carbonate-based solvent is used, a mixture of cyclic carbonate and chain carbonate may be used.

Depending on the type of lithium secondary battery, a separator may be present between the first electrode plate (e.g., the negative electrode) and the second electrode plate (e.g., the positive electrode). As the separator, polyethylene, polypropylene, polyvinylidene fluoride, or a multilayer film of two or more layers thereof may be used. The separator may include a porous substrate and a coating layer including an organic material, an inorganic material, or a combination thereof on one or both surfaces of the porous substrate. The organic material may include a polyvinylidene fluoride-based polymer or a (meth)acrylic polymer. The inorganic material may include inorganic particles selected from $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, and combinations thereof but is not limited thereto. The organic material and the inorganic material may be mixed in one coating layer or may be in the form of a coating layer containing an organic material and a coating layer containing an inorganic material that are stacked on each other.

FIG. 2 schematically illustrates a pouch-type secondary battery.

The pouch-type secondary battery includes an electrode assembly 10 and a pouch 20 that accommodates the electrode assembly 10. The electrode assembly 10 is the same as that illustrated in FIG. 1. The first electrode tab 14 and the second electrode tab 15 of the electrode assembly 10 may be electrically connected to external first and second terminal leads 16 and 17 by welding. A tab film 18 may be attached to each of the first terminal lead 16 and the second terminal lead 17 for insulation from the pouch 20.

The pouch 20 may be sealed by having sealing parts 21 at the edges thereof come into contact with each other with accommodating the electrode assembly 10 therein, in which case the sealing may be achieved with the tab film 18 interposed between the sealing parts 21. The sealing parts 21 of the pouch 20 may each be made of a thermal fusion material that has weak adhesion to metal. Thus, the thermal fusion material may be fused to the pouch 20 by interposing the thin tab film 18 between the sealing parts 21.

FIG. 3 illustrates a cylindrical secondary battery. As shown in FIG. 3, a cylindrical secondary battery may include an electrode assembly 10, a case 31 accommodating the electrode assembly 10 and an electrolyte therein, a cap assembly 32 coupled to an opening of the case 31 to seal the case 31, and an insulating plate 33 positioned between the electrode assembly 10 and the cap assembly 32 inside the case 31.

The case 31 accommodates the electrode assembly 10 and the electrolyte, and, together with the cap assembly 31, forms the external appearance of the secondary battery. The case 31 may have a substantially cylindrical body portion 12 and a bottom portion connected to one side (e.g., to one end) of the body portion. A beading part 34 (e.g., a bead) deformed inwardly may be formed in the body portion, and a crimping part 35 (e.g., a crimp) bent inwardly may be formed at an open end of the body portion.

The beading part 34 can reduce or prevent movement of the electrode assembly 10 inside the case 31 and can facilitate seating of the gasket and the cap assembly 31. The crimping part 35 may firmly fix the cap assembly 32 by pressing the edge of the case 31 against the gasket 36. The case 31 may be formed of iron plated with nickel, for example.

The cap assembly 32 may be fixed to the inside of the crimping part 35 by a gasket 36 to seal the case 31. A first lead tab 37 drawn out from the electrode assembly 10 may be connected to the cap assembly 32. A second lead tab 38 drawn out from the electrode assembly 10 may be electrically connected to the bottom of the casing 31.

FIG. 4 shows the internal structure of the prismatic secondary battery.

As shown in FIG. 4, a prismatic secondary battery may include an electrode assembly 40, a first current collector 41, a first terminal 62, a second current collector 42, a second terminal 63, a case 51, and a cap assembly 60.

An electrode assembly 40 may be formed by winding or stacking a first electrode plate, a separator, and a second electrode plate, which are formed as thin plates or films. If the electrode assembly 40 is a wound stack, a winding axis may be parallel to the longitudinal direction (e.g., the y direction) of the case 51. In other embodiments, the electrode assembly 40 may be a stack type rather than a wound type, and the shape of the electrode assembly 40 is not limited in the present disclosure. In addition, the electrode assembly 40 may be a Z-stack electrode assembly in which a positive electrode plate and a negative electrode plate are inserted to both sides of a separator, which is then bent into a Z-stack. In addition, one or more electrode assemblies may be stacked such that long sides of the electrode assemblies are adjacent to each other and accommodated in the case, and the number of electrode assemblies in the case is not limited in the present disclosure. The first electrode plate of the electrode assembly may act as a negative electrode, and the second electrode plate may act as a positive electrode. Of course, the reverse is also possible.

In the electrode assembly 40, the first current collector 41 and the second current collector 42 may be welded and connected to the first electrode tab 43 extending from the first electrode plate and the second electrode tab 44 extending from the second electrode plate, respectively. As mentioned above, in some embodiments in which the first electrode tab 43 and the second electrode tab 44 are located at the top of the electrode assembly 40, the first and second current collectors are located at the top of the electrode assembly 40.

As illustrated in FIG. 4, the first current collector 41 and the second current collector 42 are connected to the first terminal 62 and the second terminal 63 through connection members 67. In some embodiments, the connection members 67 may each have an outer peripheral surface that is threaded, and the connection members 67 may be fastened to the first terminal 62 and the second terminal 63 by screwing. However, the present disclosure is not limited thereto. For example, the connection members 67 may also be coupled to the first terminal 62 and the second terminal 63 by riveting or welding.

Figure 5:
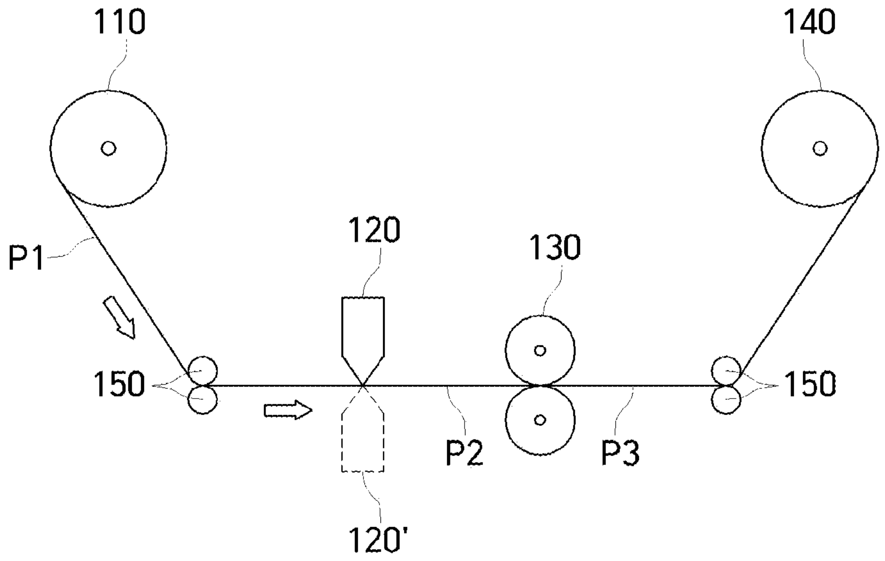
FIG. 5 is a schematic diagram for schematically explaining a process of manufacturing an electrode plate of the electrode assembly illustrated in FIG. 1.

FIG. 5 is a schematic diagram for explaining a process for manufacturing the electrode plate (i.e., the first electrode plate 11 or the second electrode plate 13) of the electrode assembly 10 illustrated in FIG. 1.

A supply roll 110 is a roll on which a substrate P1 for an electrode plate is wound. If an apparatus for manufacturing electrode plates according to some embodiments of the present disclosure is used to manufacture a positive electrode plate, the substrate P1 may be a metal foil containing aluminum (Al), for example. Alternatively, if the apparatus for manufacturing electrode plates according to some embodiments of the present disclosure is used to manufacture a negative electrode plate, the substrate P1 may be a metal foil containing copper (Cu) or nickel (Ni), for example.

A transfer roller 150 may be an idle roller that guides the substrate P1 unwounded from the supply roll 110, or a drive roller that applies a pulling force to allow the substrate P1 to be unwounded from the supply roll 110. FIG. 5 illustrates a total of four transfer rollers 150 as an example, but the number and positions of transfer rollers may be changed as needed.

A coating unit 120 forms a coating layer by coating the substrate P1 with an electrode material slurry that is previously prepared. Here, the slurry for coating contains an active material. If the apparatus for manufacturing electrode plates according to some embodiments of the present disclosure is used to manufacture the positive electrode plate, the slurry may contain an active material containing a transition metal oxide, a binder, a volatile solvent, and the like, for example. If the apparatus is used to manufacture the negative electrode plate, the slurry may be prepared with an active material containing a transition metal oxide, a binder, a solvent, or the like. A method of applying the slurry of the active material, the binder, and the solvent on a substrate is called a wet process. A method in which the active material and the binder have been mixed without a solvent and the mixed powder is sprayed onto a substrate is called a dry process. It is also possible to simultaneously coat both the upper and lower surfaces of the substrate P1 by adding a second coating unit 120', which has the same configuration as the coating unit 120 illustrated in FIG. 5, to provide the coating to the lower surface of the substrate P1.

A press unit 130, i.e., a rolling unit, uses a pair of rollers to compresses an electrode plate P2 coated with the mixture (slurry or powder) by the coating unit 120 in order to produce a high-capacity and high-density secondary battery.

A winding roll 140 winds and accommodates an electrode plate P3 coated and rolled by the coating unit 120 and the press unit 130.

Although not illustrated in FIG. 5, a drying unit may be provided between the coating unit 120 and the winding roll 140 to dry or solidify the electrode plate P2 coated with the slurry by the wet method. The drying unit may include a heat source. In addition, the drying unit may be physically separated from or otherwise functionally integrated into the press unit 130. For example, when the press unit 130 is configured in the form of a roller, the roller may be equipped with a heat source to heat and simultaneously roll the coating layer, thereby allowing the press unit 130 to be configured to also function as a drying unit.

Figure 6A:
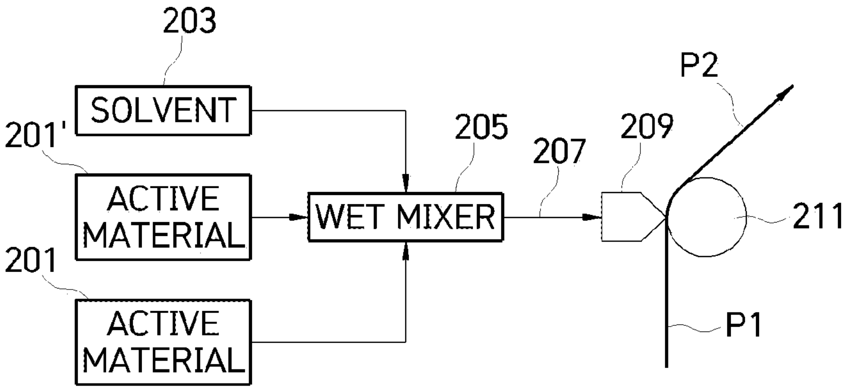
FIG. 6A is a schematic construction diagram of a wet process.

FIG. 6A is a schematic construction diagram of the aforementioned wet process.

An active material 207 in a slurry state may be produced by grinding and mixing in a wet mixer 205 active materials 201 and 201' for various types of electrodes and a solvent 203. The coated substrate P2 may be formed by applying the active material slurry on a substrate P1 by a slot die coater 209. In FIG. 6A, 211 may be a roller that transfers the substrate P1.

Figure 6B:
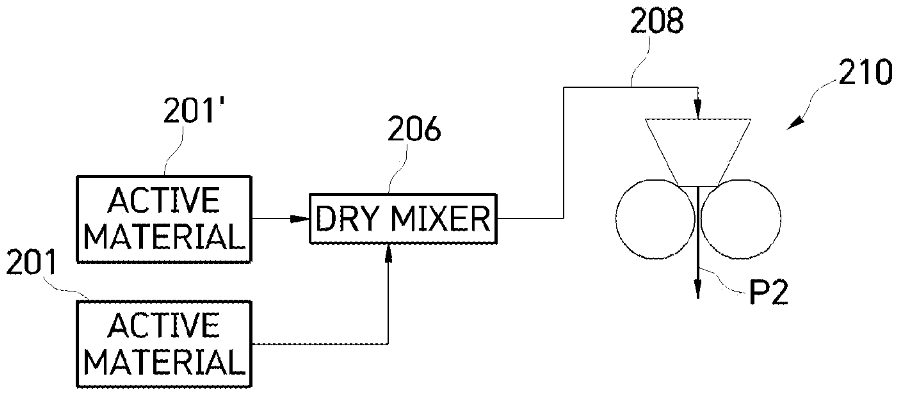
FIG. 6B is a schematic construction diagram of a dry process.

FIG. 6B is a schematic construction diagram of the aforementioned dry process.

An active material 208 in a powder state may be produced by grinding and mixing in a dry mixer 206 the active materials 201 and 201' for various types of electrodes. A coated substrate P2 may be formed by transferring the active material powder 208 by using a roll calendar part 210.

The active materials 201 and 201', that is, main raw materials of an electrode plate, may include lithium nickel-based oxide, lithium cobalt-based oxide, lithium manganese-based oxide, a lithium iron phosphate-based compound, cobalt-free nickel-manganese-based oxide, a binder, or a conductive material, in the case of a positive electrode. An active material for a negative electrode may include crystalline carbon, soft carbon, or hard carbon, such as natural graphite or synthetic graphite, mesophase pitch carbides, amorphous carbon such as calcined coke, and silicon or a silicon-carbon complex.

Foreign metallic or non-metallic substances may be mixed with the active material. Such foreign substances may need to be detected and removed from the active material because the foreign substance may cause performance and safety problems in a battery. In the step of manufacturing an electrode plate with a wet process, the presence of the foreign substances in the active material may be detected by applying an electrical method to a mixture of materials in a slurry state. In contrast, in the case with dry process, there may be no method capable of detecting the foreign substances in the active material in the powder state. After a secondary battery is manufactured, the foreign substances included in the product may be checked through a dv failure test. However, it is practically impossible to remove only the foreign substances from the product, and the product may have to be disposed because many processes have already been performed.

If the foreign substances can be detected in the active material state before the electrode plate is manufactured either in the wet process or the dry process, time and costs may be reduced. Some embodiments of the present disclosure propose a method of detecting foreign substances in a mixture of materials or an individual active material having a powder state before the active material is used in either a wet process or dry process in manufacturing an electrode plate.

Figure 7A:
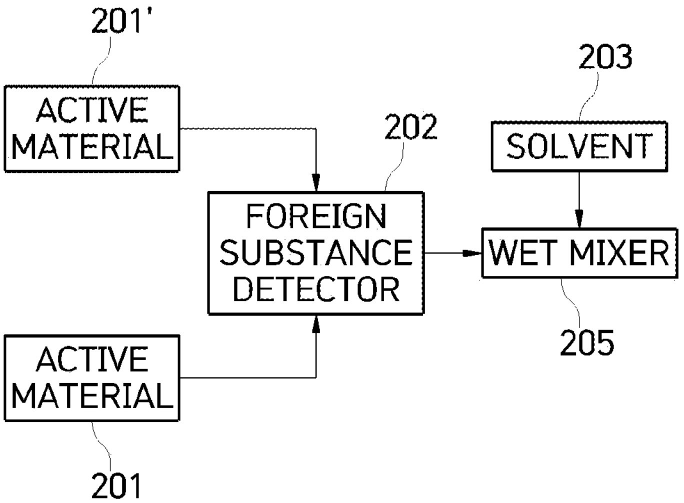
FIG. 7A illustrates a concept in which some embodiments of the present disclosure is applied to the wet process.

FIG. 7A illustrates a concept for some embodiments of the present disclosure involving the wet process.

After various active materials 201 and 201' are mixed, but before slurry is produced by mixing the materials 201 and 201' with the solvent 203 by the wet mixer 205, foreign substances may be detected in the mixed active materials 201 and 201' or individual active materials 201 or 201' in a powder state by using a foreign substance detector 202.

Figure 7B:
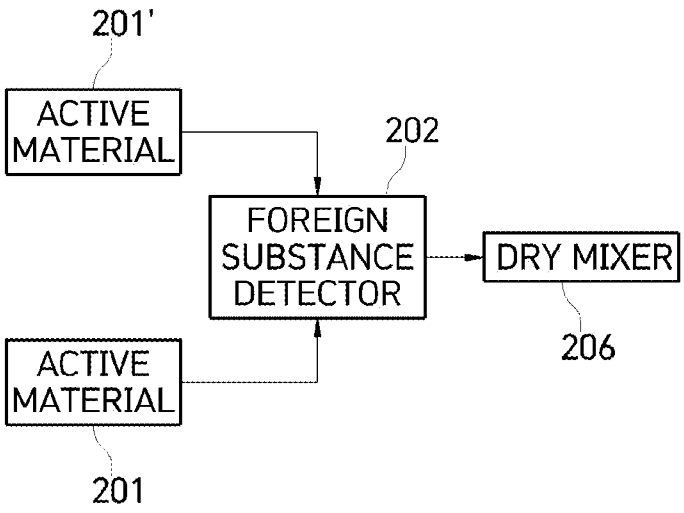
FIG. 7B illustrates a concept in which some embodiments of the present disclosure is applied to the dry process.

FIG. 7B illustrates a concept in which some embodiments of the present disclosure involving the dry process.

As in the wet process of FIG. 7A, before the active materials 201 and 201' are mixed by the dry mixer 206, foreign substances may be detected in the mixed active material 201 and 201' or an individual active material 201 or 201' in a powder state by using the foreign substance detector 202.

If the foreign substance detector 202 detects a foreign metallic/non-metallic substance in a quantity greater than a reference quantity, the foreign substance detector 202 may determine that there is a failure with respect to a corresponding active material. Thus, input the active material to a process may be stopped or the active material may be subjected to a process of removing foreign substances.

The foreign substances that are present in the active material powder may be metallic or non-metallic, and the foreign substances may have a higher density than the active material. Accordingly, it is possible to use an X-ray transmission method for detecting foreign substances based on differences between the densities of the foreign substances and the active material. However, an active material in a powder state may not be in a standardized state. If an X-ray transmission method is used, there may be a difference in the accuracy of the detection of the foreign substances depending on conditions because the amount of input of the active material may be irregular or the input speed of the active material may be different in each test.

In consideration of such problems, in some embodiments of the present disclosure, foreign substances that are present in an active material are detected by transmitting radiation, such as X-rays, through the active material to obtain transmission images, of the active material in a powder state and in a constant quantity in order to obtain constant measurement results. Also, the active material is measured at a constant transmission distance (i.e., the height of a sample), and the radiation is applied to the active material while the active material is moving. Thus, a constant radiation penetration image may be obtained of the active material that moves at a constant thickness. In the transmission image, foreign substances having a higher densities than the active material may appear as shadows because the foreign substances have less radiation permeability than the active material. The foreign substances may appear as dots. If there is a large amount of the foreign substances, the foreign substances may appear as an area.

To this end, an apparatus and method for detecting foreign substances according to some embodiments of the present disclosure may include means for equalizing the amount of input active material tested, means for moving the input active material, and means for detecting foreign substances in the active material. Embodiments in which the means are implemented are described hereinafter.

Figure 8A:
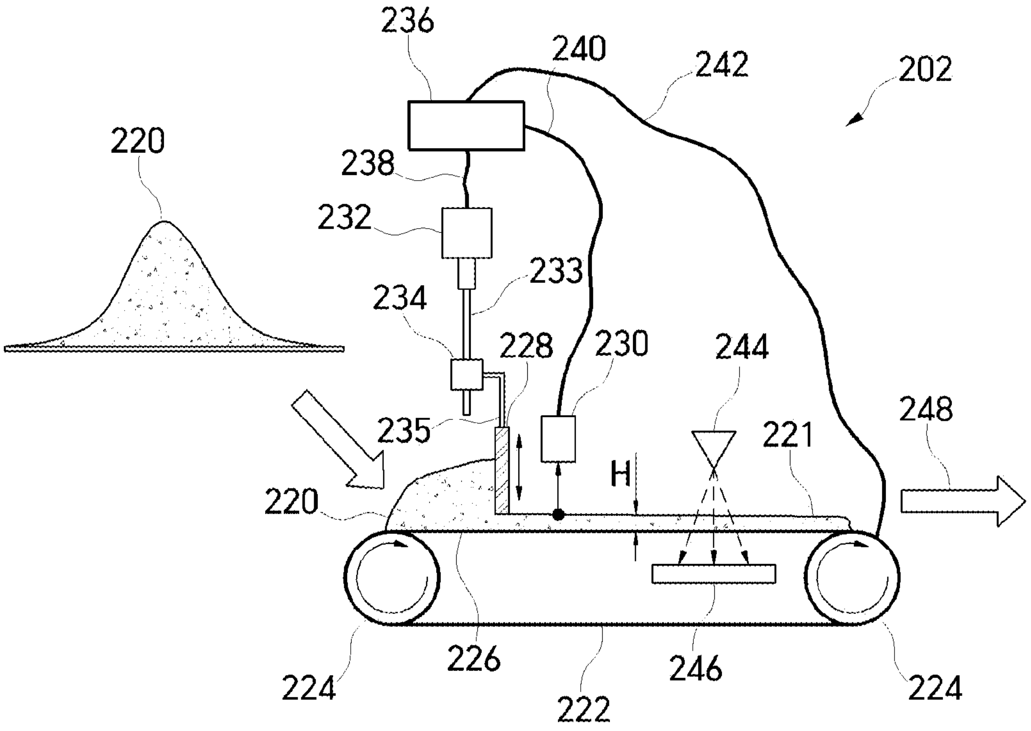
FIG. 8A is a construction diagram of some embodiments of a foreign substance detector according to some embodiments of the present disclosure.

FIG. 8A is a diagram illustrating the foreign substance detector 202 according to some embodiments of the present disclosure. In the foreign substance detector 202 of FIG. 8A, an active material 220 may be input on a conveyer belt 222, and the active material 220 is evenly spread at a constant height and moved so that foreign substances may be detected by radiation penetration. In this embodiment, the means for moving the input active material may be implemented as the conveyer belt. Further, the means for equalizing the amount active material input may be implemented as a planarization rod that evenly spreads the input active material at a constant height by contacting a surface of the active material that has been input on the conveyer belt. Furthermore, the means for detecting foreign substances in the active material may be implemented as an irradiator and a detector, such as X-ray.

Specifically, the foreign substance detector 202 according to the embodiment illustrated in FIG. 8A may include a conveyer belt 222 that transfers the active material 220 in a powder state and a driving wheel 224 that drives the conveyer belt 222. A planarization rod 228 spreads the active material 220 that has been input to a sample input part 226 of the conveyer belt 222 at a constant height H. Planarization rod elevation parts 232, 233, 234, and 235 move the planarization rod 228 up and down in order to adjust the spread height H of the active material 220. A height measurement sensor 230 measures the height H of the active material 220 that has been spread on the conveyer belt 222. A controller 236 receives a measurement signal from the height measurement sensor 230 that measures the height H of the active material and that changes the moving speed of the conveyer belt 222 and the elevation distance of the planarization rod 228 by controlling the driving wheel 224 and the planarization rod elevation parts 232, 233, 234, and 235. An irradiator 244 applies radiation, such as X-rays, to the active material 220 that has been spread on the conveyer belt 222 so that the radiation penetrates the active material, A radiation detector 246 that detects the radiation that is transmitted through the active material 220.

The planarization rod elevation parts 232, 233, 234, and 235 are illustrated in FIG. 8A. The planarization rod 228 may stand vertically at a predetermined distance from the conveyer belt 222. The planarization rod 228 may spread the active material 220 that is moved on the conveyer belt 222 after being input to the sample input part 226 of the conveyer belt 222 by contacting the active material 220. The predetermined distance may be the same as the spreading height H of the active material 220. The height H may be adjusted by a controller 236 and the planarization rod elevation parts.

The planarization rod elevation parts may include a motor 232 having rotation shaft that is vertically disposed, a rotatable lead screw 233 that is connected to the rotation shaft of the motor 232, a linearly movable reciprocation nut 234 that is engaged with the lead screw 233, and a connecting bar 235 that connects the reciprocation nut 234 and the planarization rod 228.

When the controller 236 drives the motor 232, the lead screw 233 that is connected to the rotation shaft of the motor 232 is moved. Accordingly, the reciprocation nut 234 moves up and down. And the planarization rod 228 that is connected to the reciprocation nut 234 through the connecting bar 235 moves up and down. Accordingly, the spreading height H of the active material 220 may be adjusted. The planarization rod 228 may be moved up and down by the forward/backward driving of the motor 232. This may be performed by driving control of the controller 236.

The controller 236 may control an operation of detecting foreign substances by the foreign substance detector 202 by exchanging signals with the motor 232, the height measurement sensor 230, and the driving wheel 224 through connection media 238, 240, and 242. For example, the planarization rod 228 may be moved up and down by the elevation parts to adjust the height H of a sample based on programmed conditions (e.g., the type of active material and a degree of detection precision of a foreign substance). The height H may be monitored through the height measurement sensor 230. Furthermore, the moving speed of the conveyer belt 222 may be changed by controlling the driving wheel 224.

The controller 236 may be also connected to the irradiator 244 and the radiation detector 246, and the controller 236 may directly control the irradiator 244 and the radiation detector 246. In other embodiments, the controller 236 may indirectly control the irradiator 244 and the radiation detector 246 in association with a dedicated controller that controls the irradiator 244 and the radiation detector 246.

After foreign substances are detected by the foreign substance detector 202 of FIG. 8A, the active material 220 may be discharged by a sample discharge part 221. If the detected quantity of foreign substances is less than a reference quantity, the active material may be input to a next step 248, for example, the wet mixer 205 of FIG. 7A or the dry mixer 206 of FIG. 7B. If the detected quantity of foreign substances is greater than the reference quantity, the active material may be transferred to a foreign substance removal step or a sample disposal step.

Figure 8B:
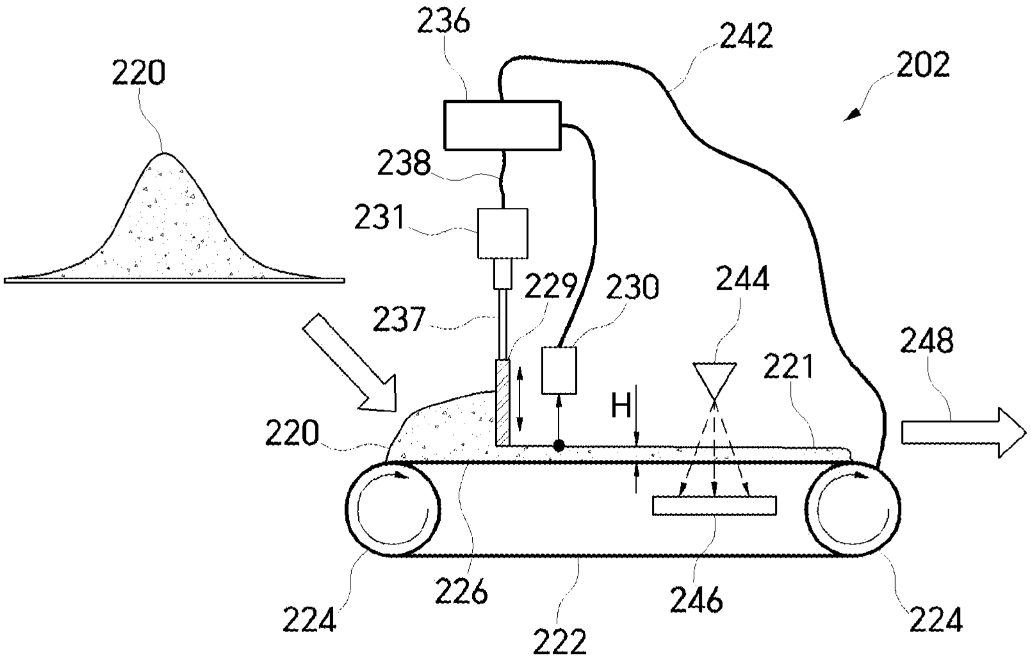
FIG. 8B is a construction diagram of a modified embodiment of the foreign substance detector illustrated in FIG. 8A.

FIG. 8B is a modified embodiment of the foreign substance detector 202 illustrated in FIG. 8A, illustrating embodiments in which the planarization rod elevation parts are implemented according to another mechanism. In this case, the planarization rod elevation parts may include a motor 231 having a rotation shaft that is vertically disposed, a rotatable lead screw 237 that is connected to the rotation shaft of the motor 232, and a linearly movable planarization rod 229 that is engaged with the lead screw 237. The planarization rod elevation parts are such that the planarization rod 229 is directly screwed onto the lead screw 237 and performs a rectilinear motion. In such a configuration, when the controller 236 drives the motor 231, the lead screw 237 that is rotated. Accordingly, the planarization rod 229 may perform move up and down such that the spreading height H of the active material 220 may be adjusted. The planarization rod 229 may move up and down by forward/backward driving of the motor 231. This may be performed by driving control of the controller 236.

Figure 9A:
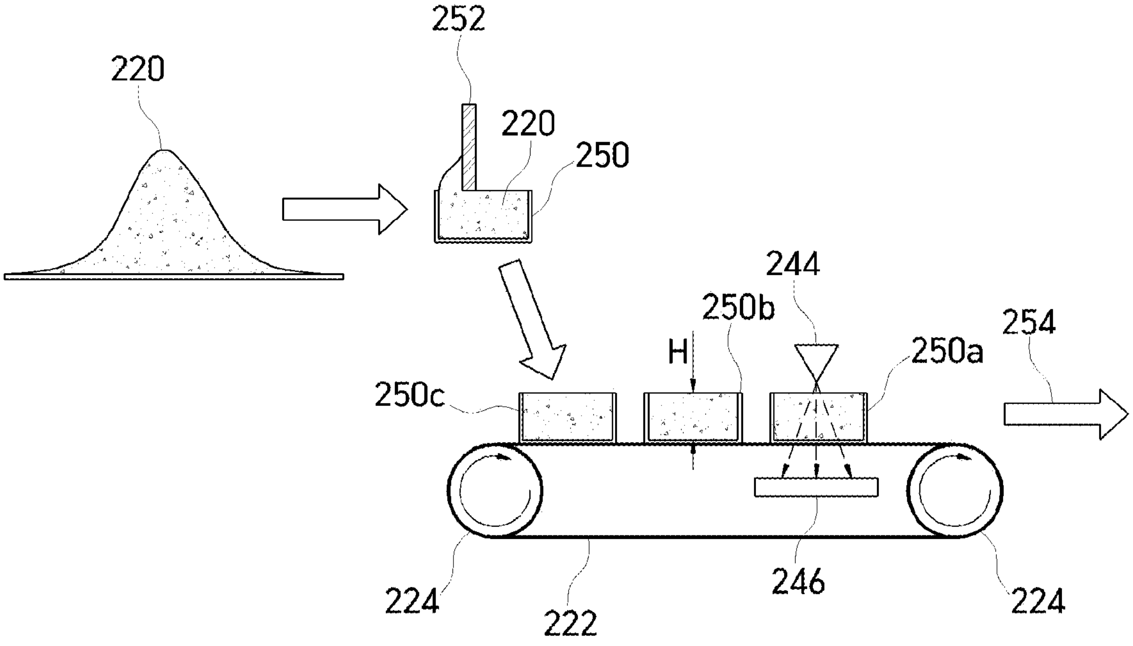
FIG. 9A is a construction diagram of some other embodiments of the foreign substance detector according to some embodiments of the present disclosure.

FIG. 9A is a diagram illustrating a foreign substance detector 202 according to embodiments of the present disclosure. In the foreign substance detector 202 according to this embodiment detects foreign substances by radiation penetration of the active material 220 that is provided in sample buckets. The active material 220 is input to the conveyer belt 222 in consistent amounts in order to enhance the accuracy of detection.

In the embodiments, means for moving an input active material and means for detecting foreign substances in the active material may be implemented as a conveyer belt and an irradiator/detector as in the embodiment of FIG. 8A. Furthermore, means for equalizing the amount of input of the active material may be implemented as a mechanism that includes multiple sample buckets for containing the active material and sequentially transfers the active material to the conveyer belt in order to input a constant quantity of the active material to the conveyer belt.

The foreign substance detector 202 according to the embodiment illustrated in FIG. 9A may include a conveyer belt 222 that transfers an active material 220 in a powder state and a driving wheel 224 that drives the conveyer belt 222 Multiple sample buckets 250 (250*a*, 250*b*, and 250*c*) are placed on the conveyer belt 222 that contain active material 220. A planarization rod 252 cuts the active material 220 contained in the sample buckets 250 at a predetermined height H such that equal quantities of the active material 220 are left in the sample buckets 250. An irradiator 244 applies radiation, such as X-rays, to the active material 220 so that the radiation penetrates the active material 220 contained in the multiple sample buckets 250*a*, 250*b*, 250*c* that are placed on the conveyer belt 222 and transferred thereon. A radiation detector 246 detects the radiation that has transmitted through the active material 220.

The foreign substance detector 202 of the present embodiment may further include a planarization part that laterally moves the planarization rod 252 in order to maintain a constant the height H of the active material 220 contained in the sample buckets 250, and a controller (not illustrated in FIG. 9A). The controller may include a function for changing the moving speed of the conveyer belt 222 by controlling the driving wheel 224 as in the embodiment of FIG. 8A. However, the present embodiment may not require a mechanism for moving the planarization rod 252 up and down as in the embodiment of FIG. 8A because the height H of the active material 220 is substantially the same as the height of an upper open part of the sample bucket 250. Furthermore, in the same context, the sensor (230 in FIG. 8A) for measuring the height H of the active material 220 may not be required.

An operation of the foreign substance detector 202 according to the present embodiment will now be described. First, the active material 220 having an approximate quantity may be contained in the sample buckets 250. The active material that is placed in each of the sample buckets 250 may be planarized such that the active material has an almost identical height H in each of the sample buckets 250 by cutting the active material above each of the sample buckets by the planarization rod 252. In this case, the planarization of the active material 220 using the planarization rod 252 may be performed by a manual mechanism or may be performed by an automated mechanism.

The conveyer belt 222 may be driven at a constant speed. The sample buckets 250*a* to 250*c* in which the surfaces of the active material 220 have been planarized may be sequentially placed on the conveyer belt 222. In this case, in order to maintain a constant timing at which the sample buckets 250 are placed on the conveyer belt 222, it may be preferred that the sample buckets 250 are placed on the conveyer belt 222 at constant intervals.

The detection of foreign substances may be performed on each of the multiple sample buckets 250*a* to 250*c* that are sequentially transferred by the conveyer belt 222, by using the irradiator 244 and the radiation detector 246. After the detection of foreign substances in the active material 220 in each sample bucket by radiation penetration has been completed, each sample bucket may be transferred to a next step 254, which may be, for example, the wet mixer 205 of FIG. 7A or the dry mixer 206 of FIG. 7B if the quantity of detected foreign substances is less than a reference quantity. If the quantity of detected foreign substances is greater than the reference quantity, the active material may be transferred to a foreign substance removal step or a sample disposal step. In this case, the transfer or transport of the sample buckets 250 may be performed by another conveyer belt or may be performed by a cart robot.

A controller not illustrated in FIG. 9A may change the moving speed of the conveyer belt 222 by controlling the driving wheel 224 based on programmed conditions (e.g., the type of active material and a degree of detection precision of a foreign substance). Furthermore, the controller may be connected to the irradiator 244 and the radiation detector 246 and may directly control the irradiator 244 and the radiation detector 246, or the controller may indirectly control the irradiator 244 and the radiation detector 246 in association with a dedicated controller that controls the irradiator 244 and the radiation detector 246.

Figure 9B:
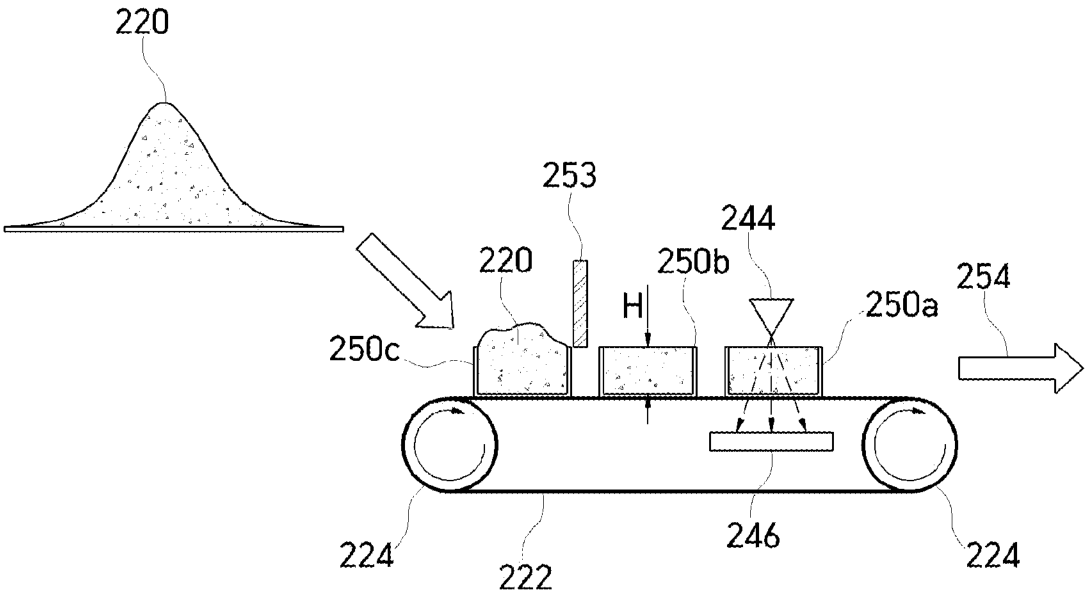
FIG. 9B is a construction diagram of a modified embodiment of the foreign substance detector illustrated in FIG. 9A.

FIG. 9B shows a modified embodiment of the foreign substance detector 202. The embodiment illustrated in FIG. 9A may be used with a method of containing the active material 220 in the sample buckets 250 and planarizing surfaces of the samples by the planarization rod 252 before the sample buckets 250 are placed on the conveyer belt 222. According to the embodiment illustrated in FIG. 9B, the planarization rod 252 is installed at a location corresponding to the height H of the buckets on the conveyer belt 222. The active material 220 is contained in the sample buckets 250 and then placed on the conveyer belt 222, the active material placed on the sample buckets 250 may be planarized by the planarization rod 252 as the sample buckets 250 pass by the planarization rod 252 because surfaces of the active material above the sample buckets 250 are cut as the conveyer belt 222 moves. According to this embodiment, a separate sample planarization process may be omitted, and the construction of the apparatus and a work process can be simplified because the planarization rod 252 may be fixed to one location.

A method of detecting foreign substances within an active material for a secondary battery by using the apparatus for detecting foreign substances will now be described.

The method of detecting foreign substances according to some embodiments of the present disclosure may include a step of making uniform the amount of input of an active material that is input; a step of moving the input active material; and a step of detecting foreign substances in the active material. The method of detecting foreign substances according to some embodiments may further include a step of changing the moving speed of the input active material.

The step of moving the input active material may be implemented by the conveyer belt.

The step of detecting foreign substances in the active material may include a step of applying radiation, such as X-rays, that penetrations the active material, and detecting the radiation that passes through the active material.

The step of making uniform the amount of input of the active material may include a planarization step of constantly spreading the input active material by cutting the height of the active material that has been input to the conveyer belt, according to some embodiments. The planarization step may include a step of adjusting the height of the planarized active material by moving the planarization rod up and down and/or a step of measuring the height of the planarized active material. Furthermore, the step of making uniform the amount of input of the active material may include a step of containing the active material in the sample bucket, spreading the active material by cutting the height of the active material contained in the sample bucket such that the height of the active material in the sample bucket is equal to the height of active material in other sample buckets, inputting the sample bucket to the conveyer belt, and moving the sample bucket, according to some other embodiments.

The results of detection experiments of foreign substances for verifying performance of the apparatus and method for detecting foreign substances within an active material for a secondary battery according to some embodiments of the present disclosure will now be described.

In preparation for the experiments, a positive electrode active material was produced by inputting Fe particles having sizes of about 50, 100, and 150 μm to the positive electrode active material at a weight ratio of 1000 ppm. A negative electrode active material was produced by inputting the same Fe particles having the sizes of about 50, 100, and 150 μm to the negative electrode active material at a weight ratio of 2000 ppm.

Experiments for detecting foreign substances were performed on the prepared negative electrode and positive electrode active material by using the foreign substance detector 202 according to some embodiments of the present disclosure. Radiation was in the form of X-rays, and a dose of the radiation was 130 kV 500 uA. The height H of the active material was set as 2 mm and 4 mm with respect to each of a positive electrode and a negative electrode. In the case of the positive electrode active material, 6 m/min and 12 m/min were applied as the moving speed V of the conveyer belt 222. In the case of the positive electrode active material, 30 m/min and 42 m/min were applied as the moving speed V of the conveyer belt 222.

Figure 10A:
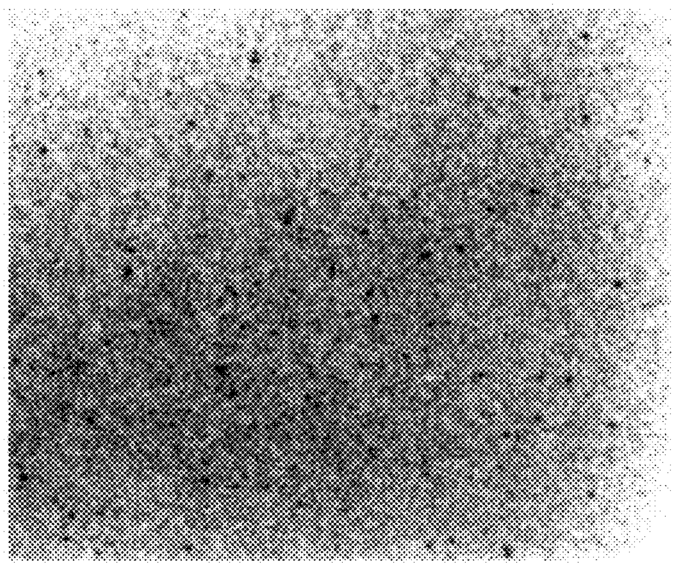
FIGS. 10A to 13B are detected images of foreign substances by the apparatus and method for detecting foreign substances according to some embodiments of the present disclosure.
Figure 10B:
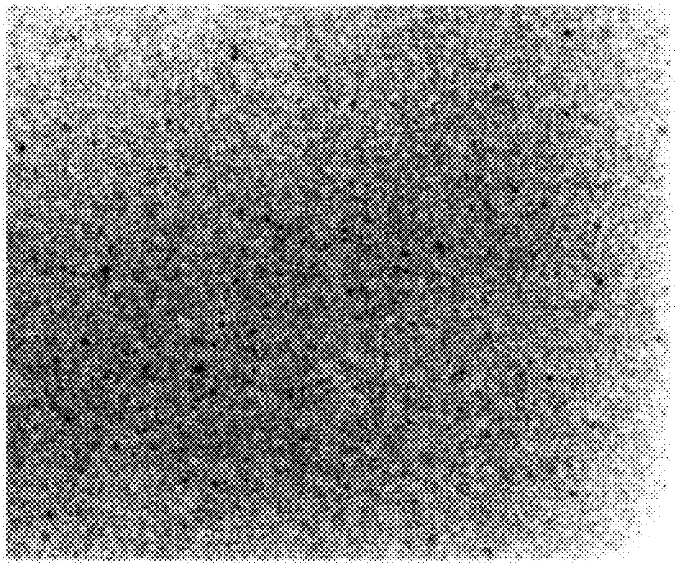

FIG. 10A is an X-ray transmission image of the positive electrode active material where the height H was 2 mm and the velocity V of the conveyer belt was 6 m/min. FIG. 10B is an X-ray transmission image of the positive electrode active material where the height H was 2 mm and the velocity V of the conveyer belt was 12 m/min. Foreign Fe substances are indicated in FIGS. 10A and 10B as dark points due to a low quantity of X-ray penetration for the Fe substances. It may be seen that a signal-to-noise ratio (SNR) was more reduced in the image of FIG. 10B than in the image of FIG. 10A as the scan speed was increased while the samples had the same height.

Figure 11A:
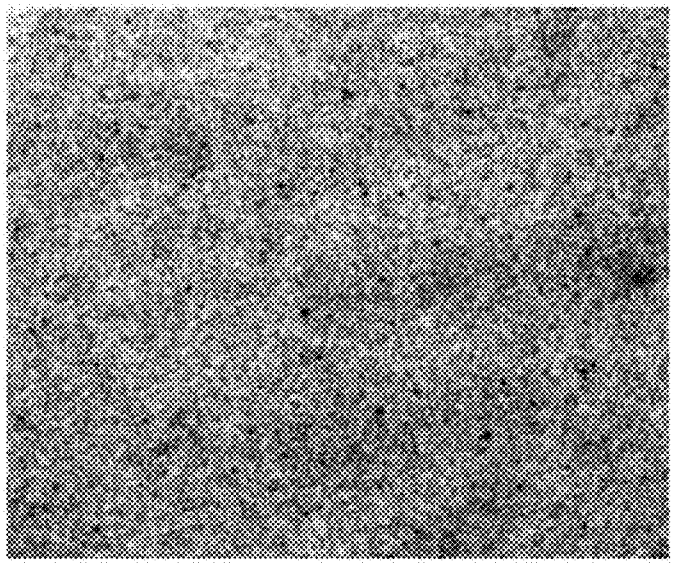
Figure 11B:
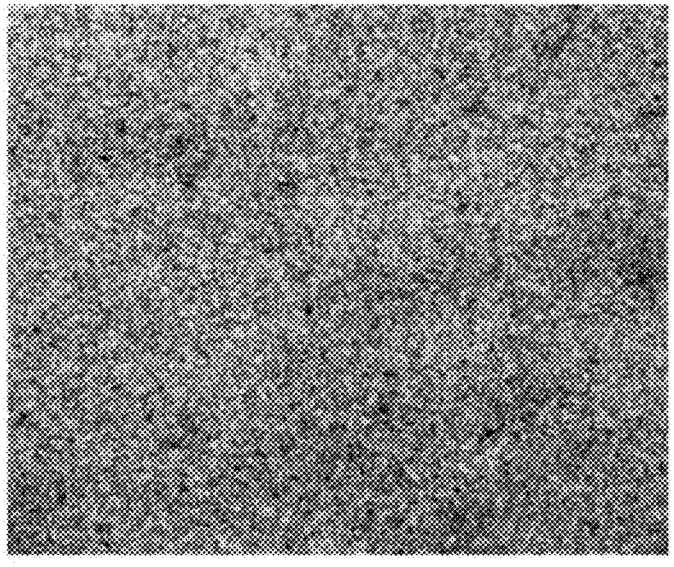

FIG. 11A is an X-ray transmission image of the positive electrode active material where the height was 4 mm and the velocity V of the conveyor belt was 6 m/min. FIG. 11B is an X-ray transmission image of the positive electrode active material where the height H was 4 mm and the velocity of the conveyor belt was 12 m/min. The dark dots of foreign Fe substances in FIGS. 11A and 11B are less clearly represented compared to the images of FIGS. 10A and 10B. The reason for this may be that the X-ray transmission distance of the sample was doubled (because the height H of the samples doubled). Even in this case, it may be seen that the SNR was more reduced in the image of FIG. 11B than in the image of FIG. 11A as the scan speed was increased with respect to the samples having the same heights.

Figure 12A:
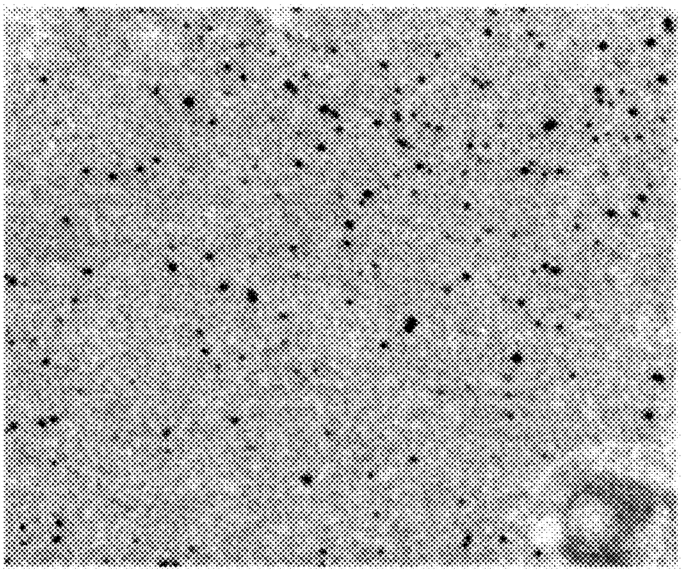
Figure 12B:
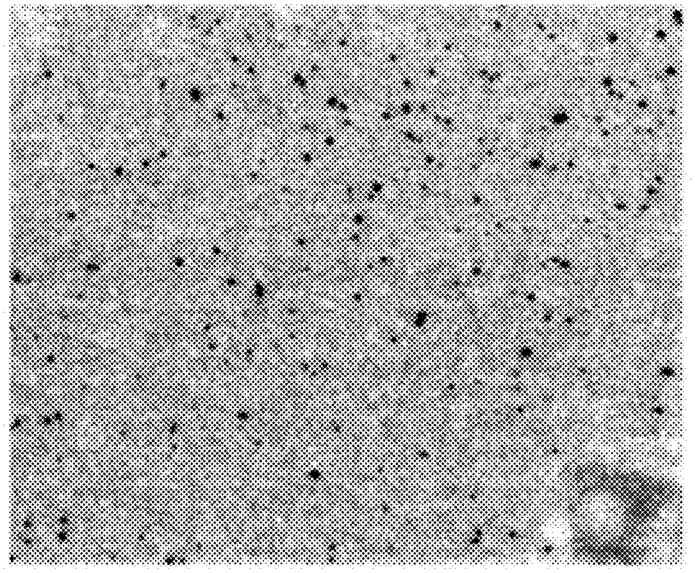

FIG. 12A is an X-ray transmission image of the negative electrode active material where the height H was 2 mm and the velocity V of the conveyor belt was 30 m/min. FIG. 12B is an X-ray transmission image of the negative electrode active material where the height H was 2 mm and the velocity V of the conveyor belt was V=42 m/min. Dark dots of foreign Fe substances are more clearly indicated as compared to the positive electrode active material. This may be due to a difference between the components of the active material. It may be seen that the SNR was reduced in the image of FIG. 12B as compared to the image of FIG. 12A as the scan speed was increased while the samples had the same heights.

Figure 13A:
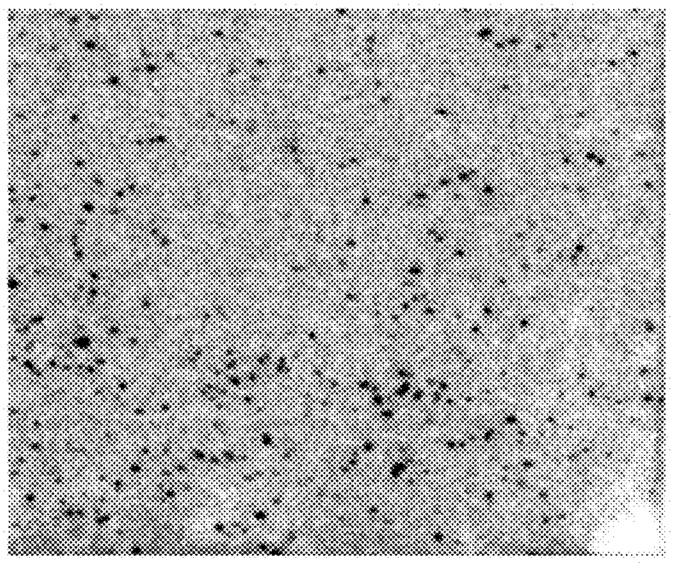
Figure 13B:
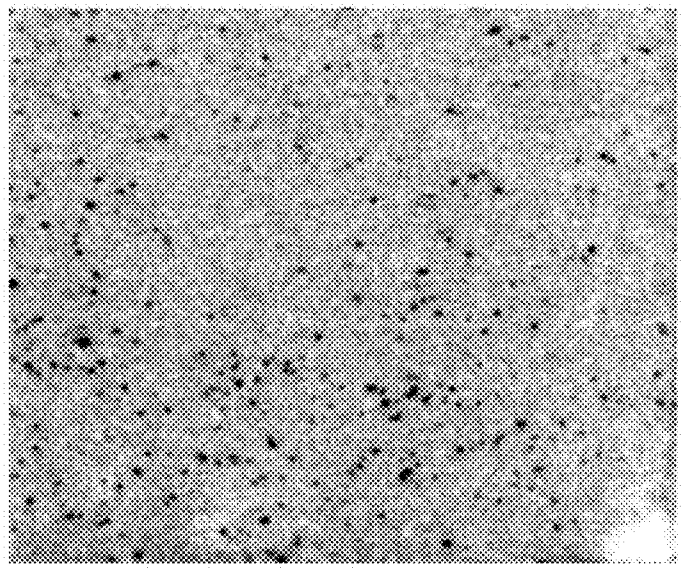

FIG. 13A is an X-ray transmission image of the negative electrode active material where the height H was 4 mm and the velocity V of the conveyer belt was 30 m/min. FIG. 13B is an X-ray transmission image of the negative electrode active material where the height was 4 mm and the velocity of the conveyer belt was 42 m/min. It may be seen that dark dots of foreign Fe substances were less represented compared to the images of FIGS. 12A and 12B because the X-ray transmission distance of the sample was doubled (because the height H of the samples doubled). Even in this case, it may be seen that the SNR was reduced in the image of FIG. 13B as compared to the image of FIG. 13A as the scan speed was increased while the samples had the same heights.

Figure 14:
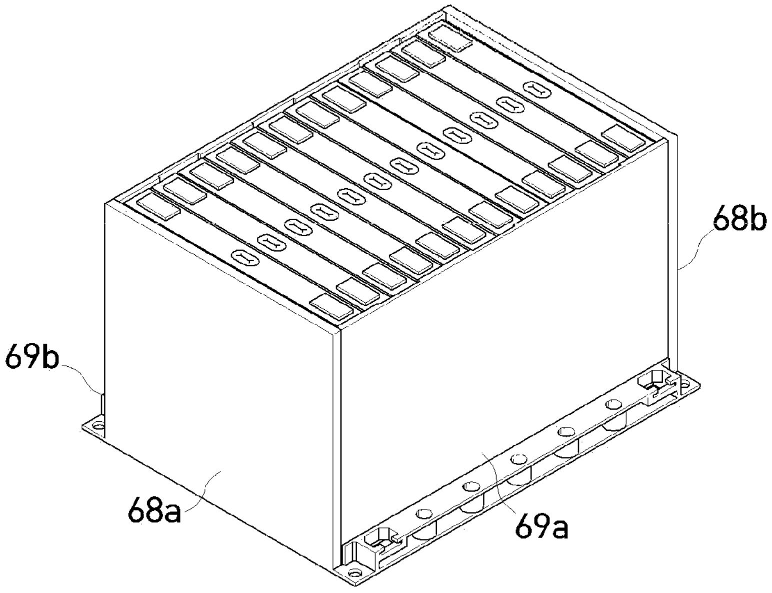
FIG. 14 is a view of a secondary battery module in which secondary batteries are arranged according to one or more embodiments of the present disclosure.

FIG. 14 shows one example of a secondary battery module in which prismatic secondary batteries are arranged according to embodiments of the present disclosure. With the increase in secondary battery capacity for driving electric vehicles or the like, a secondary battery module may be manufactured by arranging and connecting a plurality of secondary battery cells transversely and/or longitudinally. The plurality of secondary batteries may be arranged in a space defined by a pair of facing end plates 68*a* and 68*b* and a pair of facing side plates 69*a* and 69*b*. The secondary batteries may be designed appropriately in arrangement (direction) and number to obtain desired voltage and current specifications.

Figure 15:
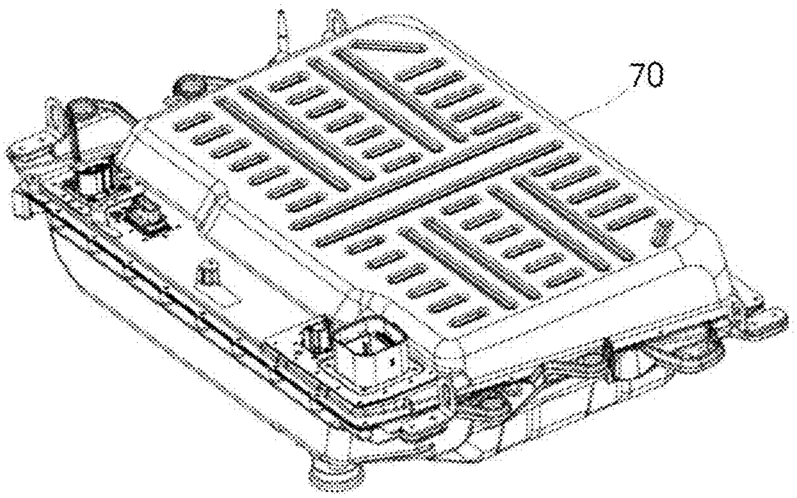
FIG. 15 is a view of a secondary battery pack including the secondary battery module illustrated in FIG. 14.

FIG. 15 is a view schematically showing the configuration of a battery pack 70 according to embodiments of the present disclosure. Referring to FIG. 15, a battery pack 70 may include an assembly to which individual batteries are electrically connected and a pack housing accommodating the same. In the drawings, for convenience of illustration, components including a bus bar, a cooling unit, external terminals for electrically connecting batteries, etc., are not shown.

Figure 16:
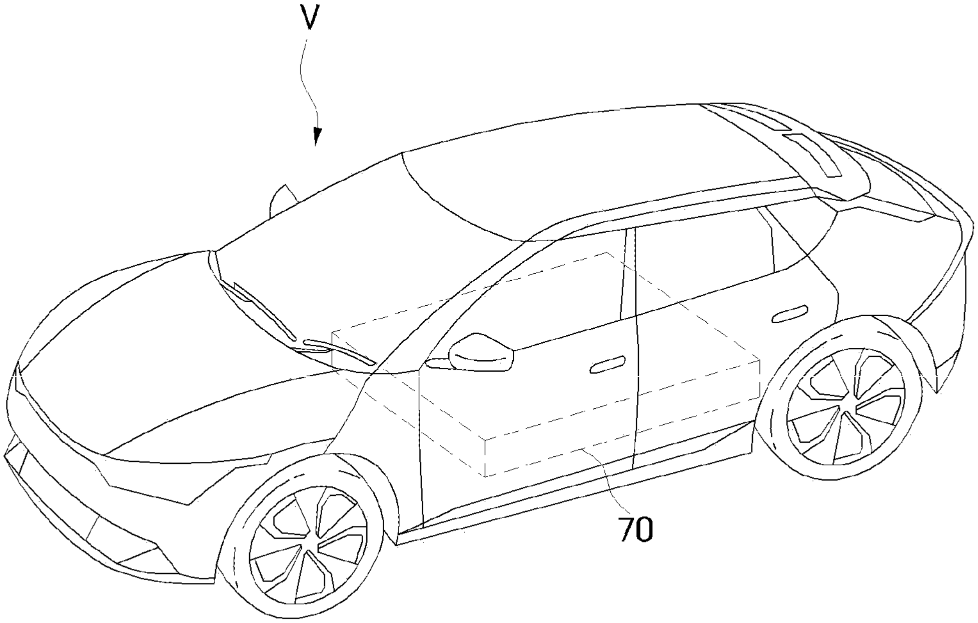
FIG. 16 is a conceptual view of a vehicle including the secondary battery pack illustrated in FIG. 15.

The battery pack 70 may be mounted on (or in) a vehicle. The vehicle may be, for example, an electric vehicle, a hybrid vehicle, or a plug-in hybrid vehicle. The vehicle may be a four-wheeled vehicle or a two-wheeled vehicle, but is not limited thereto. FIG. 16 shows a vehicle V that includes the battery pack 70 shown in FIG. 15 on the lower body thereof. The vehicle V may operate by (e.g., may be powered by) receiving power from the battery pack 70.

Although the present disclosure has been described above with respect to embodiments thereof, the present disclosure is not limited thereto. Various modifications and variations can be made thereto by those skilled in the art within the spirit of the present disclosure and the equivalent scope of the appended claims.

According to the embodiments of the present disclosure, costs and time can be reduced because a failure can be detected at an initial manufacturing step by detecting foreign substances in an active material that is input to a process of manufacturing a secondary battery. Furthermore, fires and explosions can be prevented because a failure rate is reduced and safety of a finally manufactured battery is improved.

Furthermore, according to the embodiments of the present disclosure, the input of a foreign metallic or non-metallic substance can be prevented in a step for an active material in the existing wet process and dry process and in manufacturing the electrode plate of an all-solid-state battery.

DESCRIPTION OF REFERENCE SYMBOLS

10: electrode assembly, 11: first electrode plate, 12: separator, 13: second electrode plate, 14: first electrode tab, 15: second electrode tab, 16: first terminal lead, 17: second terminal lead, 18: tab film, 20: pouch, 21: sealing part, 31: case, 32: cap assembly, 33: insulating plate, 34: beading part, 35: crimping part, 36: gasket, 37: first lead tab, 38: second lead tab, 40: electrode assembly, 41: first current collector, 42: second current collector, 43: first electrode tab, 44: second electrode tab, 51: case, 61: cap plate, 62: first terminal, 63: second terminal, 64: electrolyte injection hole, 65: notch, 66: vent, 67: connection member, 68*a* 68*b*: end plate, 69*a* 69*b*: side plate, 70: secondary battery pack, 110: supply roll, 120 120': coating unit, 130: press unit, 140: winding roll, 150: transfer roller, 207: slurry mixture, 208: mixture powder, 209: slot die coater, 210: roll calendar part, 211: transfer roller, 220: active material, 221: sample discharge part, 222: conveyer belt, 224: conveyer belt driving wheel, 226: sample input part, 228 229: planarization rod, 230: sensor that measures height H of active material, 220 236: controller, 244: irradiator, 246: radiation detector, 231 232: motor, 233 237: lead screw, 234: reciprocation nut, 235: connecting bar, 236: controller, 238 240 242: connection medium, 248: next step, 250 250*a* 250*b* 250*c*: sample bucket, 252: planarization rod, H: height of spread active material sample, P1: substrate, P2: electrode plate on which electrode material has been coated, P3: rolled electrode plate, V: vehicle

What is claimed is:

1. An apparatus for detecting foreign substances in a battery electrode active material powder for a secondary battery, the apparatus comprising:
- means for equalizing an amount of the battery electrode active material powder that is input to the apparatus;
- means for moving the input battery electrode active material powder;
- an irradiator configured to apply radiation to the moving battery electrode active material powder; and
- a radiation detector configured to detect radiation that passes through the moving active material to thereby detect the presence of foreign substances in the battery electrode active material powder.

2. The apparatus as claimed in claim 1, further comprising a discharge part configured to discharge the input battery electrode active material powder after detection of foreign substances by the irradiator and the detector has been completed.

3. The apparatus as claimed in claim 1, wherein the means for equalizing the amount of the battery electrode active material powder comprises a planarization rod configured to spread the battery electrode active material powder such that a height of the input battery electrode active material powder is constant.

4. The apparatus as claimed in claim 3, wherein the means for equalizing the amount of input of the battery electrode active material powder further comprises a controller configured to move the planarization rod up and down.

5. The apparatus as claimed in claim 3, further comprising a sensor configured to measure a height of the battery electrode active material powder that has been spread by the planarization rod.

6. The apparatus as claimed in claim 1, wherein the means for moving the input battery electrode active material powder comprises a conveyer belt.

7. The apparatus as claimed in claim 6, further comprising a controller configured to change a moving speed of the conveyer belt.

8. The apparatus as claimed in claim 1, wherein the means for equalizing the amount of input of the battery electrode active material powder comprises:
- a sample bucket configured to contain the battery electrode active material powder; and
- a planarization rod configured to spread the battery electrode active material powder contained in the sample bucket such that the battery electrode active material powder has a constant height.

9. The apparatus as claimed in claim 8, further comprising a planarization part configured to horizontally move the planarization rod.

10. The apparatus as claimed in claim 8, wherein the planarization rod is configured to planarize the surface of the battery electrode active material powder contained in the sample bucket as the sample bucket is moved horizontally with the planarization rod in a fixed state.

11. A method of detecting foreign substances in a battery electrode active material powder that is used in a secondary battery, the method comprising:
- inputting a battery electrode active material powder to an apparatus;
- making an amount of the battery electrode active material powder that is input uniform;
- moving the input battery electrode active material powder; and
- applying radiation to the moving battery electrode active material powder and detecting radiation that has passed through the moving battery electrode active material powder to thereby detect the presence of foreign substances in the battery electrode active material powder.

12. The method as claimed in claim 11, further comprising discharging the input battery electrode active material powder after detection of foreign substances by the application and detection of the radiation has been completed.

13. The method as claimed in claim 11, wherein the making the amount of input of the battery electrode active material powder uniform comprises spreading the battery electrode active material powder by using a planarization rod such that a height of the input battery electrode active material powder is constant.

14. The method as claimed in claim 13, wherein the making uniform of the amount of the battery electrode active material powder further comprises moving the planarization rod up and down.

15. The method as claimed in claim 13, further comprising measuring a height of the battery electrode active material powder.

16. The method as claimed in claim 11, wherein the moving of the input battery electrode active material powder is performed by using a conveyor belt.

17. The method as claimed in claim 16, further comprising changing a moving speed of the conveyor belt.

18. The method as claimed in claim 11, wherein the making the amount of input of the battery electrode active material powder uniform comprises:
- a step of containing the battery electrode active material powder in a bucket; and
- a planarization step of spreading a surface of the battery electrode active material powder contained in the bucket such that the battery electrode active material powder has a constant height.

19. The method as claimed in claim 18, wherein the planarization step is performed by moving a planarization rod horizontally.

20. The method as claimed in claim 18, wherein the planarization step is performed so that the surface of the battery electrode active material powder contained in the bucket is planarized by a planarization rod by moving the bucket horizontally with the planarization rod in a fixed state.

21. An apparatus for detecting foreign substances in a battery electrode active material powder for a secondary battery, the apparatus comprising:
- a planarization rod configured to spread the battery electrode active material powder such that a height of the battery electrode active material powder is constant;
- a conveyor belt for moving the battery electrode active material powder;
- an irradiator configured to apply radiation to the battery electrode active material powder being moved by the conveyor belt; and
- a radiation detector configured to detect radiation that passes through the battery electrode active material powder to thereby detect the presence of foreign substances in the battery electrode active material powder.

* * * * *